(12) United States Patent
Klassen et al.

(10) Patent No.: US 8,307,537 B1
(45) Date of Patent: Nov. 13, 2012

(54) METHOD OF USING A TOOLING MANDREL FOR ASSEMBLING A DISK DRIVE

(75) Inventors: Andrew S. Klassen, San Jose, CA (US); Robert E. Lloyd, Jr., Gilroy, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 915 days.

(21) Appl. No.: 12/353,757

(22) Filed: Jan. 14, 2009

Related U.S. Application Data (62) Division of application No. 11/257,368, filed on Oct. 24, 2005, now abandoned.

(51) Int. Cl.
*G11B 5/105* (2006.01)
*B25B 9/04* (2006.01)
(52) U.S. Cl. ........... 29/603.03; 29/737; 29/759; 294/93; 294/100
(58) Field of Classification Search ............... 29/603.03, 29/603.02, 737, 758, 759, 762; 294/93, 94, 294/100; 360/98.07, 99.08
See application file for complete search history.

(56) References Cited

U.S. PATENT DOCUMENTS

| | | | |
|---|---|---|---|
| 3,200,483 A | | 8/1965 | Menegoni |
| 3,588,983 A | | 6/1971 | Hoy |
| 4,573,378 A | | 3/1986 | McDonald |
| 5,520,704 A | | 5/1996 | Castro et al. |
| 5,542,526 A | * | 8/1996 | Wurgler ..................... 294/93 X |
| 6,085,410 A | | 7/2000 | Toensing et al. |
| 6,382,413 B1 | | 5/2002 | Nakamura et al. |
| 6,571,591 B2 | | 6/2003 | Itaya |
| 6,971,154 B2 | * | 12/2005 | Yoo et al. ................... 29/603.03 |
| 7,490,398 B1 | | 2/2009 | Klassen et al. |
| 7,552,526 B1 | | 6/2009 | Klassen et al. |
| 2003/0002400 A1 | | 1/2003 | Klein |

FOREIGN PATENT DOCUMENTS

| | | | |
|---|---|---|---|
| JP | 55068660 A | 5/1980 | |
| JP | 06060924 A | * 3/1994 | ................... 29/762 X |

OTHER PUBLICATIONS

U.S. Appl. No. 11/034,002, 23 pages.
U.S. Appl. No. 11/257,368, 28 pages.
Office Action dated Mar. 31, 2008 from U.S. Appl. No. 11/257,368, 7 pages.
Office Action dated May 29, 2008 from U.S. Appl. No. 11/257,368, 9 pages.
Office Action dated Nov. 26, 2008 from U.S. Appl. No. 11/257,368, 7 pages.

* cited by examiner

*Primary Examiner* — A. Dexter Tugbang (57) ABSTRACT

A method of using a tooling mandrel for assembling a disk drive is described. The method includes providing a head stack assembly including a shaft with an engagement feature, and providing the tooling mandrel including two tooling fingers, one of which is movable. The movable tooling finger is moved between a first configuration in which respective distal tips of the tooling fingers are insertable into and removable from the engagement feature and a second configuration in which the distal tips engage the engagement feature. The tooling mandrel further includes a tooling finger spreader coupled to the movable tooling finger to selectively move the movable tooling finger between the first and second configurations. The method further includes locating the distal tips at least partially within the engagement feature with the tooling fingers in the first configuration, and moving the movable tooling finger to the second configuration to engage the shaft.

16 Claims, 9 Drawing Sheets

METHOD OF USING A TOOLING MANDREL FOR ASSEMBLING A DISK DRIVE

CROSS REFERENCE TO RELATED APPLICATION

This application is a divisional of U.S. patent application Ser. No. 11/257,368, filed Oct. 24, 2005, which is incorporated by reference in its entirety.

BACKGROUND OF THE INVENTION

1. Field of the Invention

The present invention relates generally to disk drives and in particular to tooling mandrels for assembling disk drives, and methods of assembling disk drives using the same.

2. Description of the Related Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base.

The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to data tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. The pivot assembly includes a pivot bearing cartridge that has a shaft, a sleeve disposed about the shaft, and bearings disposed there between. A coil support extends from one side of the actuator body, and a coil is supported by the coil support. The coil is configured to interact with one or more permanent magnets to form a voice coil motor. Energizing the coil results in forces that tend to pivot the actuator. A change in the direction of current through the coil results in a change in the resulting pivot direction.

One or more actuator arms extend from an opposite side of the actuator body. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both surfaces along annular data regions. As such, the head stack assembly may be pivoted such that each transducer head is disposed adjacent the various annular data regions.

A topic of concern is the assembly process in regards to the head stack assembly. Engagement of a head stack assembly with a disk drive base may begin with a "pick and place" operation. This involves picking up a head stack assembly from its storage location and placing it upon a disk drive base at an assembly station. This may be done either manually or through the use of an automated device, such as a "pick and place" robotic armature.

The shaft of the pivot bearing cartridge may be slightly asymmetrical. Such slight asymmetrical nature may result in an axial run-out phenomenon that manifests itself as inconsistent performance from one disk drive to the next. As such, it is desirable to consistently install the head stack assemblies at a consistent angular disposition with respect to their respective disk drive bases. During installation, once the head stack assembly is disposed in the disk drive base, a separate tool may be used to orient the shaft at a predetermined angle. This may be done either manually or through the use of an automated device located at the assembly station. Finally, the head stack assembly is attached to the disk drive base. For example, a fastener may be used to attach the shaft of the pivot bearing cartridge to the disk drive base. This also may be done either manually or through the use of an automated device located at the assembly station. However, to grasp the shaft of the pivot bearing cartridge and to prevent it from rotating when the fastener (typically a screw) is tightened, the robotic armature conventionally grasps the outer diameter of the shaft, while a screw-driver-shaped member engages a slot formed in the shaft to counter the angular forces imposed upon the shaft when the screw is tightened. This prevents the shaft from rotating away from its predetermined orientation during the screw driving step. Conventionally, the slot defined within the shaft of the pivot bearing cartridge extends across the entire diameter of the shaft.

However, recent design constraints have rendered this orientation stabilization method less than optimal. Such design changes have included moving the inner race of the top ball bearing assembly closer to the slot defined within the shaft. Therefore, the screw driver-shaped member that engaged the slot defined within the top portion of the shaft of the pivot bearing cartridge risks damaging the inner race of the top ball bearing assembly, which may, in turn, exacerbate the effects of above-mentioned axial run-out phenomenon. As such, there is a need in the art for improved tools and methods for assembling disk drives, and for preventing other problems, such as contamination brinelled bearings, frozen bearings, etc.

SUMMARY OF THE INVENTION

According to an embodiment thereof, the present invention is a tooling mandrel for use in assembling a disk drive. The disk drive may include a shaft that defines a shaft outer diameter. The shaft may include an engagement feature recessed within the shaft and entirely contained within the shaft outer diameter. The tooling mandrel may include at least two tooling fingers, at least one of which being movable, the at least one movable tooling finger being configured to be moved between a first configuration in which respective distal tips of the tooling fingers are insertable into and removable from the engagement feature, and a second configuration in which the distal tips of the tooling fingers are configured to engage the engagement feature; and at least one tooling finger spreader coupled to the at least one movable tooling finger and configured to selectively move the at least one movable tooling finger between the first and second configurations.

According to further embodiments, the shaft may define an axis of rotation, and the distal tips may be configured to exert a radial force directed away from the axis of rotation when the tooling fingers are in the second configuration. The engagement feature may define a closed recessed shape within the shaft outer diameter, and the distal tips, when the tooling fingers are in the second configuration, may be configured to define a corresponding shape that mates with the closed recessed shape of the engagement feature. The distal tips may be disposed away from one another when the tooling fingers are in the second configuration. The distal tips may be disposed closer to one another when the tooling fingers are in the first configuration than when the tooling fingers are in the second configuration. The distal tips, when the tooling fingers are in the second configuration, may be configured to define a cross-sectional shape that includes at least three sides. The at least two tooling fingers may include three tooling fingers. The tooling mandrel may further include at least one movable wedge that is configured to be moved between a first wedge configuration in which the tooling fingers remain in the first configuration and a second wedge configuration in which the at least one wedge is disposed at least partially between the at least two tooling fingers to maintain the at least two tooling fingers in the second configuration.

According to a further embodiment thereof, the present invention is a method of assembling a disk drive. The method may include steps of providing a head stack assembly including a shaft, the shaft defining a shaft outer diameter and including an engagement feature recessed within the shaft and entirely contained within the shaft outer diameter; providing a tooling mandrel, the tooling mandrel including at least two tooling fingers, at least one of which being movable, the at least one movable tooling finger being configured to be moved between a first configuration in which respective distal tips of the tooling fingers are insertable into and removable from the engagement feature and a second configuration in which the distal tips are configured to engage the engagement feature, the tooling mandrel further including a tooling finger spreader coupled to the at least one movable tooling finger and configured to selectively move the at least one movable tooling finger between the first and second configurations; locating the distal tips at least partially within the engagement feature with the tooling fingers in the first configuration; and moving the at least one movable tooling finger to the second configuration to engage the shaft.

The method, according to still further embodiments, may also include steps of: providing a disk drive base; positioning the shaft against the disk drive base; and attaching the shaft to the disk drive base with the tooling fingers in the second configuration to prevent the shaft from rotating relative to the disk drive base. A step of moving the at least one movable tooling finger to the first configuration may be carried out after the attaching step. The shaft may define an axis of rotation and the positioning step may include orienting the shaft at a predefined angle about the axis of rotation with respect to the disk drive base. The shaft may include an orientation mark. The orienting step may include rotating the tooling mandrel about the longitudinal axis until the shaft is disposed at the predefined angle about the axis of rotation with respect to the disk drive base. The rotation of the tooling mandrel may be performed during the positioning step. The rotation of the tooling mandrel may be performed before the positioning step. The attaching step may include using a fastener through the disk drive base to engage the shaft. The fastener may include a screw or a rivet, for example. The attaching step may be carried out by or may include one or more of the following steps: press fitting the shaft into the disk drive base; soldering the shaft to the disk drive base; heat bonding the shaft to the disk drive base; and disposing a layer of adhesive between the shaft and the disk drive base. The distal tips may be disposed away from one another when the tooling fingers are in the second configuration. The distal tips may be disposed closer to one another when the tooling fingers are in the first configuration than when the tooling fingers are in the second configuration. The distal tips, when the tooling fingers are in the second configuration, may be configured to define a cross-sectional shape that includes at least three sides. The at least two tooling fingers may include three tooling fingers. The method may also include steps of: providing at least one movable wedge that is configured to be moved between a first wedge configuration in which the at least two tooling fingers remain in the first configuration and a second wedge configuration in which the at least one wedge is disposed between the at least two tooling fingers to maintain the at least two tooling fingers in the second configuration; and moving the at least one wedge to the second wedge configuration to maintain the at least two tooling fingers in the second configuration.

DESCRIPTION OF THE PREFERRED EMBODIMENTS

Figure 1A:
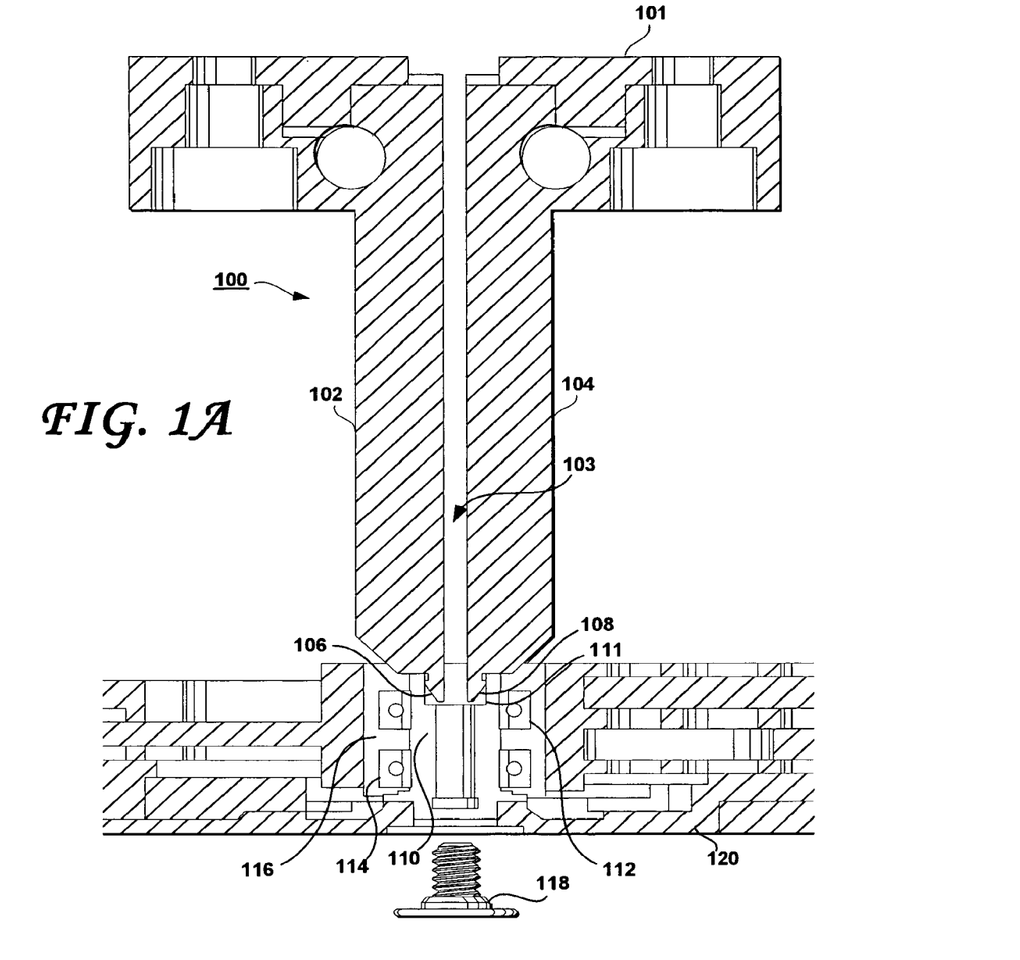
FIG. 1A is a cross-sectional view of the tooling mandrel for assembling a disk drive according to an embodiment of the present invention, shown engaged in an engagement feature of the disk drive.
Figure 1B:
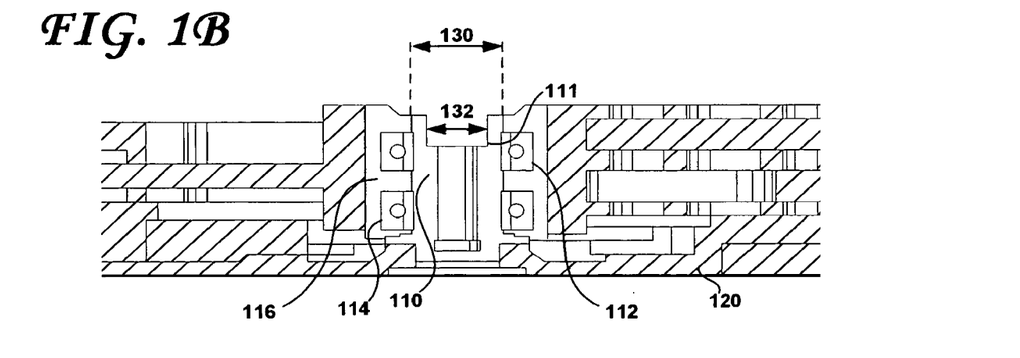
FIG. 1B is a cross-sectional view of a portion of a disk drive, illustrating the manner in which the engagement feature is entirely contained within the shaft outer diameter.

FIG. 1A is a cross-sectional view of the tooling mandrel 100 for assembling a disk drive according to an embodiment of the present invention, as well as a cross-sectional view of a portion of the drive's head stack assembly. FIG. 1B shows the cross-sectional view of a portion of the head stack assembly alone, without the tooling mandrel 100. Considering now FIGS. 1A and 1B collectively, the tooling mandrel 100 may be coupled to a pneumatic air gripper 101 (shown in FIG. 2) to which may be coupled at least two tooling fingers 102, 104. The pneumatic air gripper 101 may be configured to move one or more of the tooling fingers 102, 104 between first and second configurations. According to an embodiment of the present invention, the first configuration may be defined as one in which the respective distal tips 106, 108 of the tooling fingers 102, 104 are insertable into and removable from an engagement feature 111 defined within a shaft 110 that is to be attached to a disk drive base 120. The second configuration of the tooling fingers 102, 104 may be defined as one in which the respective distal tips 106, 108 of the tooling fingers 102, 104 are configured to engage the engagement feature 111 defined within the shaft 110. The tooling fingers 102, 104 of FIG. 1A are shown in the second configuration in which they are engaged with the engagement feature 111 of the shaft 110 of the pivot bearing cartridge. As shown in FIGS. 1A and 1B, the pivot bearing cartridge may include a sleeve 116 that surrounds the shaft 110. A ball bearing assembly may be disposed between the shaft 110 and the sleeve 116 to enable the sleeve 116 to rotate relative to the shaft 110. The ball bearing assembly may include a first ball bearing race 112 and a second ball bearing race 114. The shaft 110 of the pivot bearing cartridge may be attached to the disk drive base 120 by a fastener such as, for example, a screw (shown in FIG. 1A at reference numeral 118) or by a rivet, for example. Alternatively, the shaft 110 may be attached to the disk drive base 120 by press fitting the shaft 110 into the disk drive base 120, by soldering the shaft to the disk drive base, by heat bonding the shaft 110 to the disk drive base 120 and/or by disposing a layer of adhesive between the shaft 110 and the disk drive base 120, to identify but a few possibilities.

FIG. 1B is a cross-sectional view of a portion of the head stack assembly assembled into the base. As shown, the engagement feature 111 is recessed within the shaft 110 and entirely contained within the shaft outer diameter. That is, the engagement feature may be configured such that the engagement feature 111 is centered on the axis of rotation of the shaft 110 and such that the dimension 132 of the engagement feature 111 is less than a dimension 130 of the shaft 110—that is, less than the diameter of the shaft, for example. As may be appreciated, had the dimension 132 of the engagement feature 111 been greater than the dimension 130 of the shaft 110, the distal tips 106, 108 of the tooling fingers 102, 104 could impinge on the first ball bearing race 112 of the ball bearing assembly of the head stack assembly.

Figure 1C:
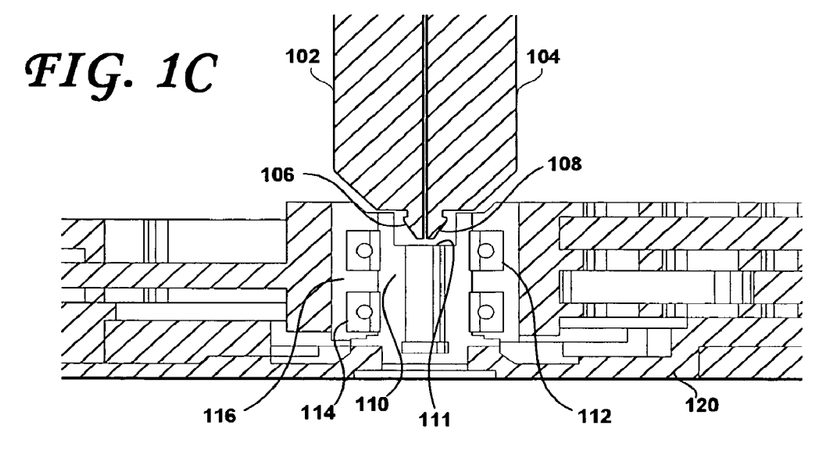
FIG. 1C shows a cross-sectional view of a portion of a head stack assembly and a cross-sectional view of a portion of the tooling mandrel according to an embodiment of the present invention, with the tooling fingers thereof in a first configuration.
Figure 1D:
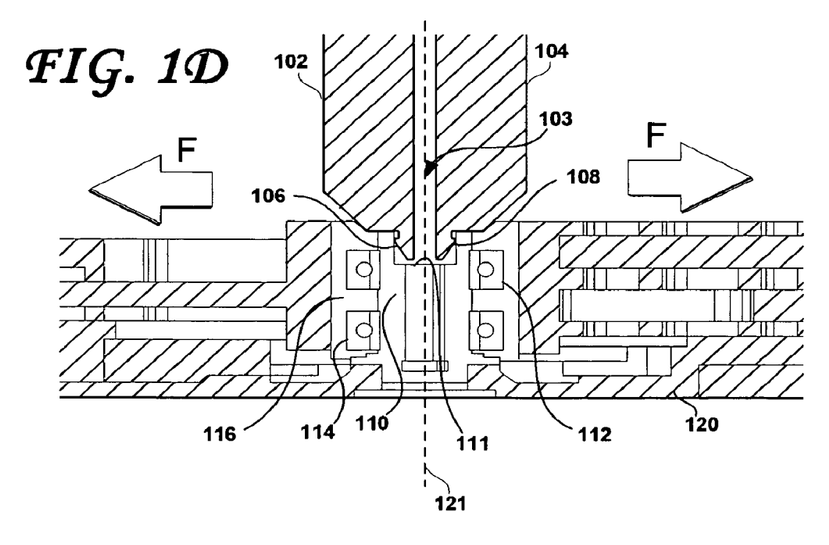
FIG. 1D shows a cross-sectional view of a portion of a head stack assembly and a cross-sectional view of a portion of the tooling mandrel according to an embodiment of the present invention, with the tooling fingers thereof in a second configuration.

FIG. 1C shows the tooling fingers 102, 104 in the first configuration in which respective distal tips 106, 108 thereof may be inserted into and removed from the engagement feature 111. According to an embodiment of the present invention, the first configuration may be one in which the tooling fingers 102, 104 are brought into intimate contact with one another (or closer than they would be if moved to the second configuration). FIG. 1D shows the tooling fingers 102, 104 in the second configuration in which respective distal tips 106, 108 thereof are configured to engage the engagement feature 111. According to an embodiment of the present invention, the distal tips 106, 108 may be disposed closer to one another when their respective tooling fingers 102, 104 are moved to the first configuration than when the tooling fingers 102, 104 are moved to the second configuration. Indeed, according to an embodiment of the present invention, the second configuration may be one in which the tooling fingers 102, 104 are separated from one another by a space 103 (also shown in FIG. 1A) so as to cause outer surfaces of the respective distal tips 106, 108 of the tooling fingers 102, 104 to abut and to exert an outwardly and radially directed force against the inner surface(s) that define the engagement feature 111. That is, the shaft 110 may define an axis of rotation 121 (FIG. 1D), and when the tooling fingers 102, 104 are moved to the second configuration, the respective distal tips thereof 106, 108 may be configured to exert a radial force F directed away from the axis of rotation 121. The abutment of the distal tips 106, 108 against the inner surface(s) of the engagement feature 111 enables embodiments of the present tooling mandrel 100 to pick up, move, manipulate and place head stack assemblies or other drive components such as, for example, ramp or latch assemblies.

The engagement feature 111 may define a closed recessed shape within the outer diameter of the shaft 110. The distal tips of the tooling fingers may advantageously be shaped so as to define, when the tooling fingers are moved to the second configuration, a corresponding shape that mates with the closed recessed shape of the engagement feature. Several illustrative examples of differently shaped engagement features and correspondingly shaped distal tips are shown in FIGS. 2-6.

Figure 2:
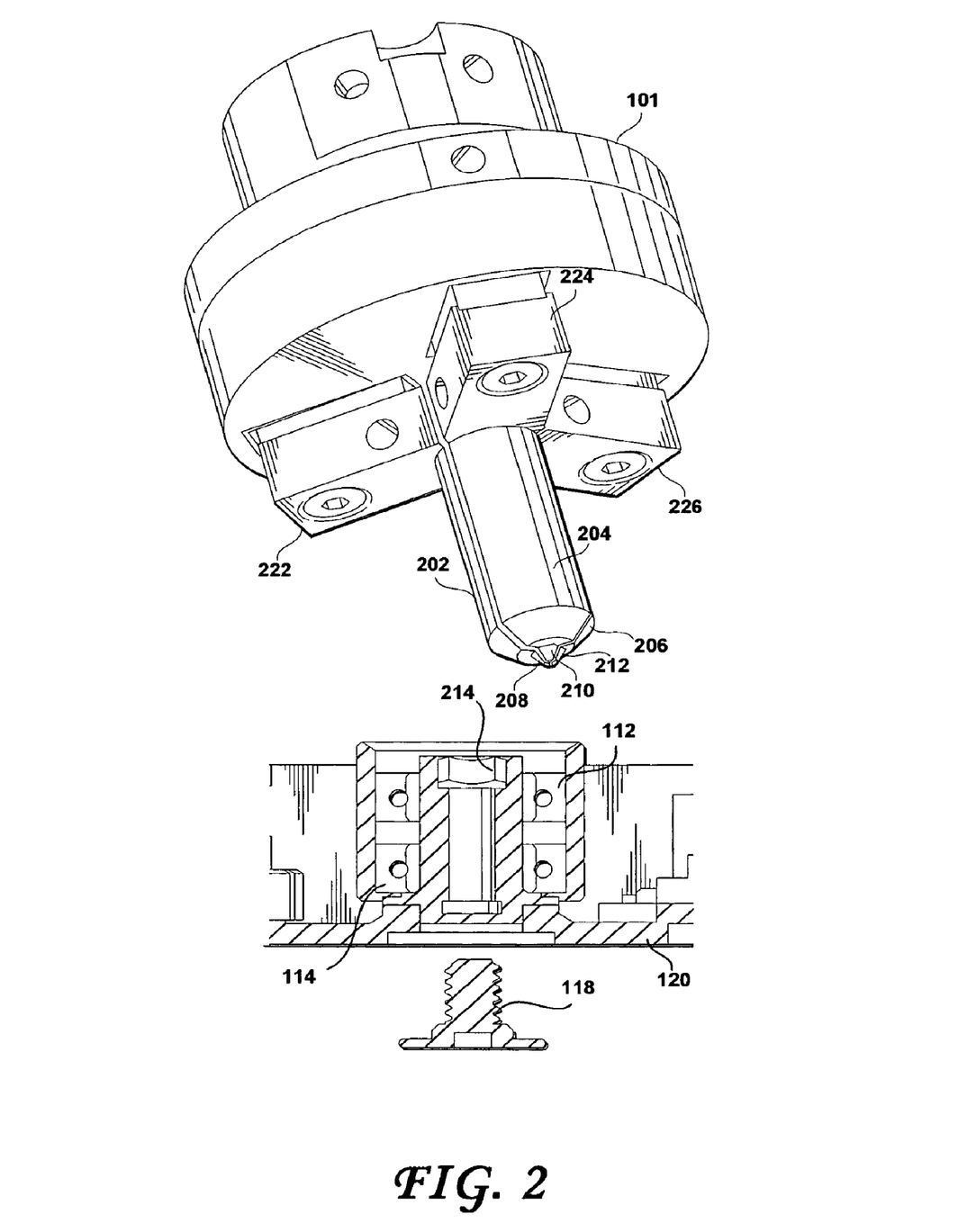
FIG. 2 is a perspective view of the tooling mandrel according to an embodiment of the present invention, together with a cross-sectional view of a portion of a head stack assembly that includes an engagement feature.

FIG. 2 shows a perspective view of the tooling mandrel according to an embodiment of the present invention, together with a cross-sectional view of a portion of a head stack assembly that includes an engagement feature. The superior portion of the tooling mandrel may include and/or be coupled to a pneumatic air gripper 101. Suitable air grippers may be obtained from, for example, SMC Corporation of America of Indianapolis, Ind. FIG. 2 shows a three finger pneumatic air gripper, such as the MHR3-10R model from SMC. The MHR3-10R model operates by moving the tooling fingers apart by pneumatic pressure. However, air grippers are available in rotary driven, two, three and four finger parallel styles that are effective to reliably grip and center workpieces (such as HSAs, for example). Other available models include wide opening parallel models; angular models having a speed adjustment built in; models having a toggle to give reliable gripping support; models suitable for clean room or low-contamination environments that are equipped with a protective boot. Other types of grippers, actuated by hydraulic or electrical means (for example), may be used as well. In the embodiment shown in FIG. 2, three tooling fingers 202, 204 and 206 are coupled to the three finger pneumatic air gripper 101 via respective tooling finger bases 222, 224 and 226. Shown in cross-section in FIG. 2, the engagement feature 214 may define at least three surfaces. The engagement feature 214 and the respective three distal tips 208, 210 and 212 may be mutually configured such that the respective distal tips 208, 210 and 212 of the tooling fingers 202, 204 and 206 may be insertable into and removable from the engagement feature 214 when the tooling fingers are in the first configuration and such that the respective distal tips 208, 210 and 212 of the tooling fingers 202, 204 and 206 may engage the engagement feature 214 when the tooling fingers are in the second configuration. That is, the tooling fingers 202, 204, 206 may be configured and shaped such that the respective distal tips 208, 210 and 212 thereof may be inserted in the first configuration into the engagement feature 214, and spread to the second configuration so as to create or enlarge the space 103 defined between the tooling fingers 202, 204, 206. In the second configuration in which the distal tips of the tooling fingers engage the engagement feature, the tooling mandrel is secured to the shaft 110 of the head stack assembly, so as to enable the head stack assembly to be picked up, moved, manipulated and placed onto the disk drive base 120. The engagement feature may define most any shape and the distal tips of the tooling fingers may be correspondingly shaped and configured to be inserted into and engaged therein.

Figure 3:
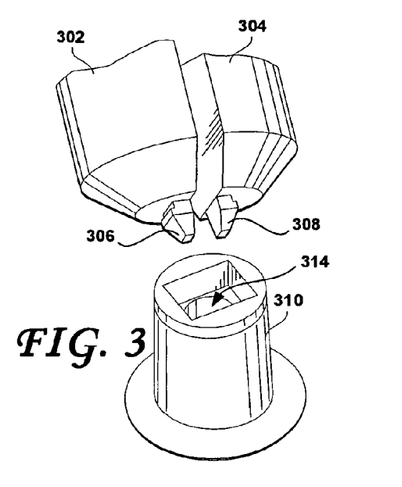
FIG. 3 is a perspective view of an engagement feature of a disk drive together with a perspective view of a portion of a two finger rectangular embodiment of the tooling mandrel of the present invention.

FIGS. 3-6 show various exemplary shapes for the engagement feature of the shaft 110 and corresponding embodiments of the tooling mandrel of the present invention. It is to be noted that the embodiments shown in FIGS. 3-6 are shown for illustrative purposes only. Those of skill will readily recognize that variations from the embodiments depicted are possible. For example, the shape of the distal tips of the tooling fingers, the number of tooling fingers and the shape of the engagement feature may vary from those shown. FIG. 3 shows an embodiment of a tooling mandrel having a first tooling finger 302 terminated by a first distal tip 306 and a second tooling finger 304 terminated by a second distal tip 308. In this embodiment, the first and second distal tips 306, 308 form a generally rectangular shape in cross-section that corresponds to the shape of the engagement feature 314. As shown, the engagement feature 314 is recessed within the shaft 310 and entirely contained within the outer diameter thereof. When in the first configuration, the first and second distal tips 306, 308 may be freely insertable into and removable from the engagement feature 314. When moved to the second configuration (spread apart, for example) when inserted into the engagement feature 314, the distal tips 306, 308 may exert a force on the sidewalls of the engagement feature 314 to enable the shaft 310 (or other drive component that defines such a recessed engagement feature) to be picked up and placed at a selected location during the manufacture of the drive.

Figure 4:
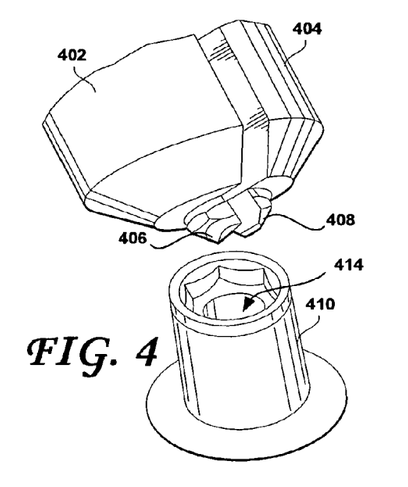
FIG. 4 is a perspective view of an engagement feature of a disk drive together with a perspective view of a portion of a two finger hexagonal embodiment of the tooling mandrel of the present invention.

The embodiment of FIG. 4 is similar to that shown in FIG. 3, but for the respective shapes of the distal tips 406, 408 of the tooling fingers 402, 404 and the shape of the engagement feature 414 defined within the shaft 410. As shown, the engagement feature 414 may define six sidewall surfaces, and the distal tips 406, 408 may collectively form a shape that is insertable therein and mates therewith. Forming the engagement feature and the distal tips of the tooling fingers with a greater number of surfaces may ease the insertion of the distal tips into the engagement feature.

Figure 5:
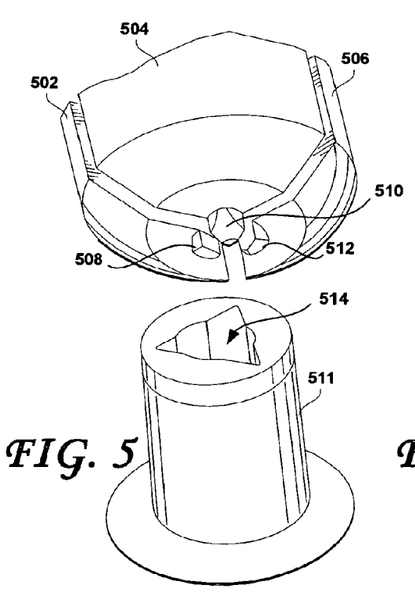
FIG. 5 is a perspective view of an engagement feature of a disk drive together with a perspective view of a portion of a three finger, generally triangular embodiment of the tooling mandrel of the present invention.
Figure 6:
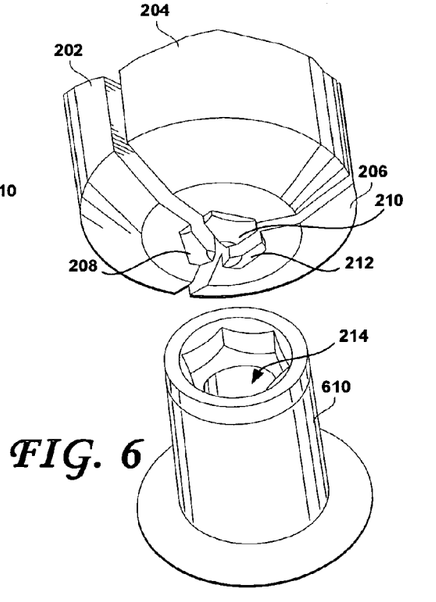
FIG. 6 is a perspective view of an engagement feature of a disk drive together with a perspective view of a portion of a three finger hexagonal embodiment of the tooling mandrel of the present invention.

FIG. 5 shows a three finger embodiment of the present tooling mandrel. As shown, the tooling mandrel may include first, second and third tooling fingers 502, 504 and 506, each terminated by respective distal tips 508, 510 and 512. The engagement feature 514 of the shaft 511, in this embodiment, is defined by sidewalls that generally form a triangular shape, with curved cutouts defined within each of the sidewalls. Lastly, the illustrative embodiment of FIG. 6 is another three finger embodiment, including first, second and third tooling fingers 202, 204, 206, each terminated by distal tips 208, 210 and 212, respectively. The engagement feature 214 recessed within the shaft 610 has a generally hexagonal shape, similar to that shown in FIGS. 2 and 4. As may be appreciated from FIGS. 2-6, the sidewalls of the engagement feature of the shaft may be straight as shown in FIG. 3, curved, or may define more complex compound surfaces, as shown in FIG. 5. The number of sidewalls of the engagement feature may also be selected at will, as may be the shape and number of distal tips of the tooling fingers. According to further embodiments, only selected ones of the tooling fingers may be movable. For example, in a two-finger embodiment of the present tooling mandrel, only one of the two tooling fingers may be configured to be movable, and the other one of the two may be fixed in place. Alternatively, each one of the tooling fingers may be movable.

Figure 7A:
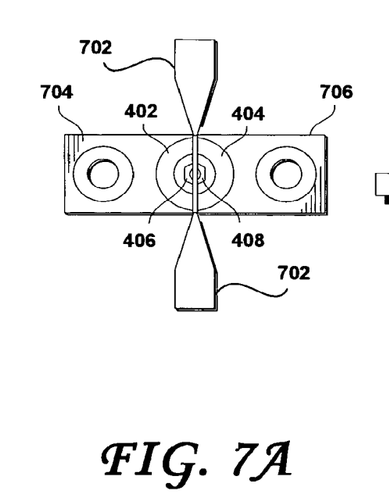
FIG. 7A is a bottom view of a portion of a tooling mandrel according to an embodiment of the present invention, showing the tooling fingers in a first configuration.
Figure 7B:
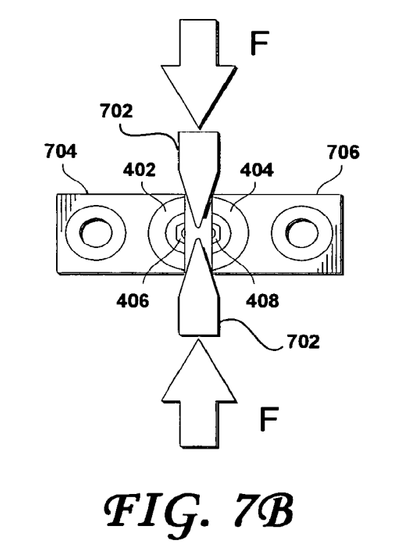
FIG. 7B is a bottom view of a portion of a tooling mandrel according to an embodiment of the present invention, showing the tooling fingers that have been moved to a second configuration.

FIGS. 7A and 7B are bottom views of a portion of a two-finger tooling mandrel according to an embodiment of the present invention. Also shown in these views are the tooling finger bases 704, 706 that may be coupled to a pneumatic air gripper (not shown in FIGS. 7A and 7B), or to another device that is operable to selectively spread the tooling fingers of the present tooling mandrel. When the respective distal tips 406, 408 of the tooling fingers 402, 404 are inserted into an engagement feature, the force and friction of the distal tips against the corresponding sidewalls of the engagement feature may be sufficient to securely hold the shaft 110. However, it may also be desirable to use some mechanical force to spread the tooling fingers and/or to keep them spread while the drive component within which the engagement feature is defined (such as shaft 110, for example) is picked up, moved and placed within the drive during manufacture thereof. Toward that end, an embodiment of the present invention may utilize one or more movable wedges 702 that are configured to be moved between a first wedge configuration (as shown in FIG. 7A) in which the wedge(s) 702 is/are disposed away from the at least two tooling fingers and a second wedge configuration in which the wedge(s) is/are pushed, inserted or otherwise disposed at least partially between the tooling fingers to maintain the (at least two) tooling fingers in the second configuration, as shown in FIG. 7B. In FIG. 7B, the movable wedges 702 have been moved to a position in which they are disposed between the tooling fingers 402, 404 to thereby maintain them in the second configuration. The wedges 702 may be moved between the tooling fingers 402, 404 by imposing thereon a force, shown in FIG. 7B by the letter F.

Figure 8:
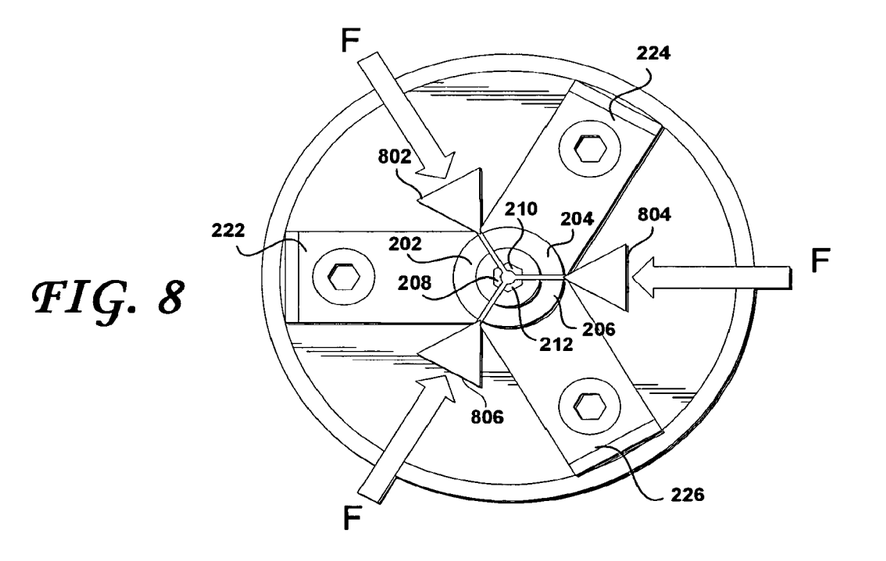
FIG. 8 is a bottom view of a portion of the tooling mandrel of FIGS. 2 and 6, illustrating an exemplary application of forces against the movable tooling fingers by wedges to maintain the tooling fingers in the second configuration.

FIG. 8 is a bottom view of a portion of the tooling mandrel of FIGS. 2 and 6, illustrating an exemplary application of forces against the movable tooling fingers by wedges to maintain the tooling fingers in the second configuration. As shown therein, three movable wedges 802, 804 and 806 may be provided to selectively spread (or maintain spread) the tooling fingers 202, 204, 206 by means of the selective application of forces F.

Figure 9:
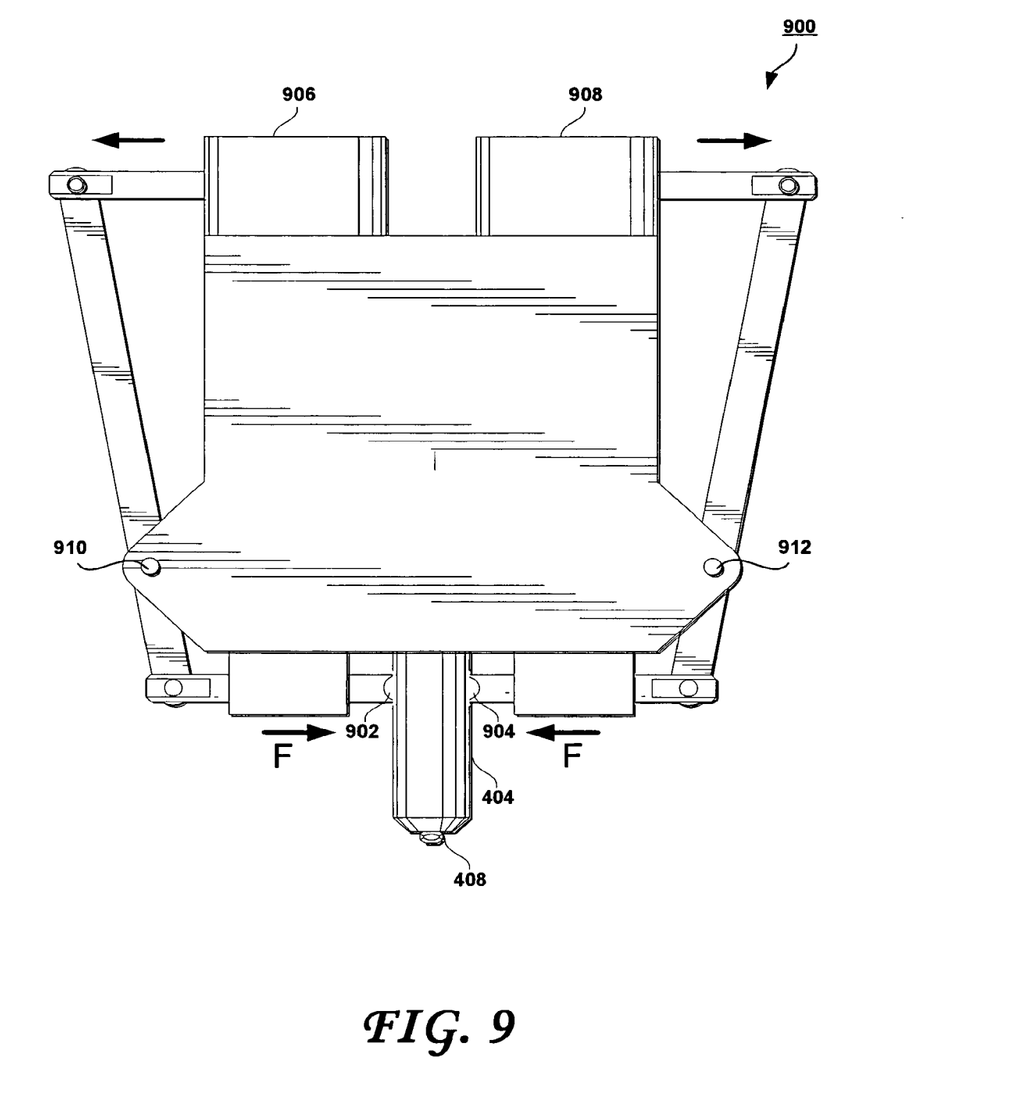
FIG. 9 shows a first view of a tooling finger spreader, according to an embodiment of the present invention.
Figure 10:
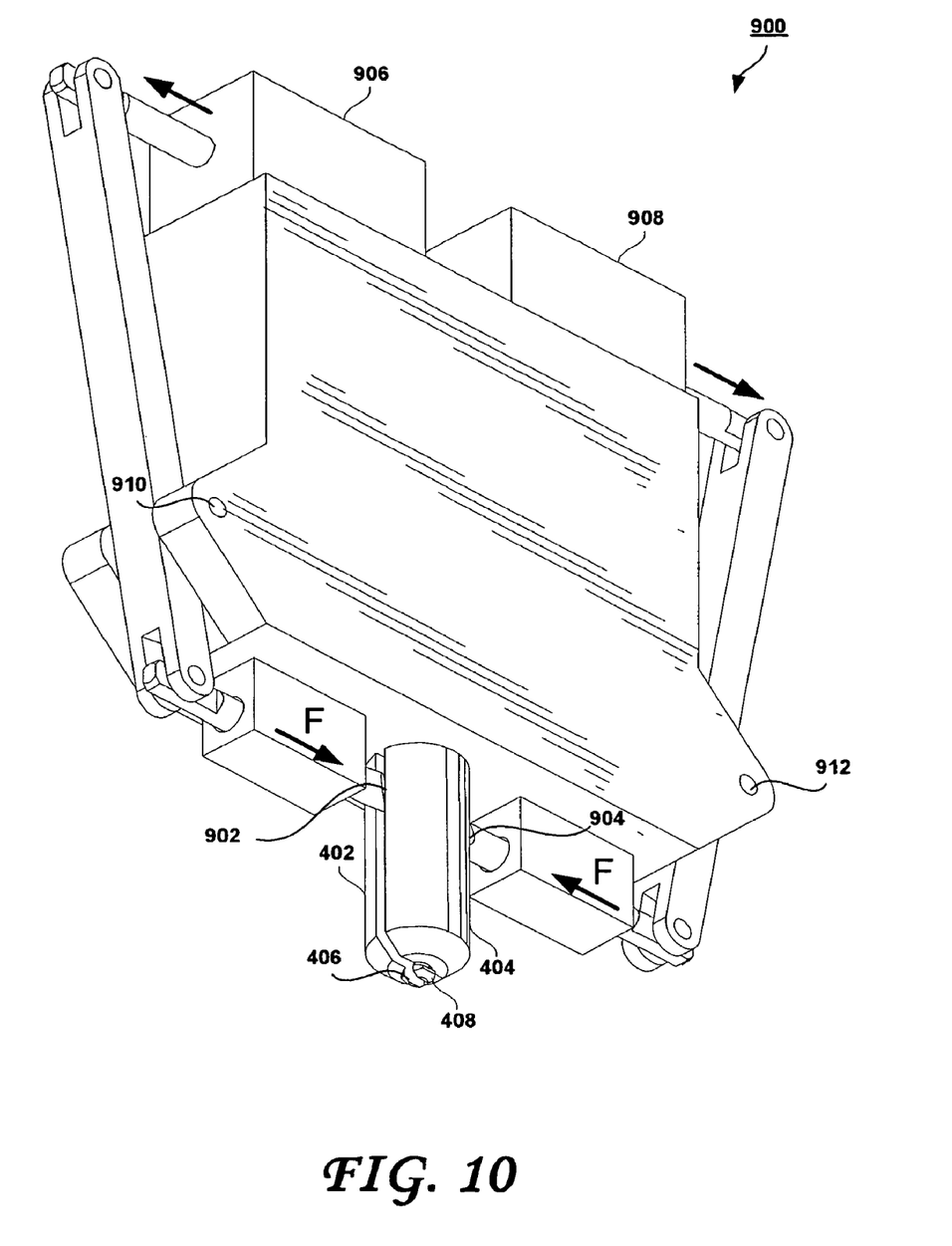
FIG. 10 shows a second view of the tooling finger spreader of FIG. 9.

FIGS. 9 and 10 show front and perspective view, respectively, of a tooling finger spreader 900, according to an embodiment of the present invention. As shown therein, the tooling finger spreader 900 may include first and second actuators 906, 908 that may be configured to selectively push and pull on rod assemblies to selectively move wedges 902, 904. The movable wedges 902, 904 may be moved from a first wedge configuration in which the wedges 902, 904 do not spread the tooling fingers 402, 404 to a second wedge configuration in which the movable wedges 902, 904 are moved between the tooling fingers 402, 404 to spread or to maintain them in the second (spread) configuration, which is the state illustrated in FIGS. 9 and 10. It is to be noted that the air gripper best shown in FIG. 2 and the tooling finger spreader 900 shown in FIGS. 9 and 10 constitute but one of many possible mechanisms to spread and/or maintain spread the tooling fingers of the present tooling mandrel. Other spreading means may readily be devised by those of skill in this art, such as pneumatic or hydraulic pressure apparatuses, and all such spreading means are deemed to fall within the scope of the present inventions. It may be envisaged that the air gripper 101 and the tooling finger spreader may be combined in a single unit that is operative to spread the tooling fingers by, e.g., hydraulic or pneumatic pressure and to maintain them in the second configuration by, e.g., mechanical elements such as the movable wedges, such as shown at 902, 904 in FIGS. 9 and 10.

Figure 11:
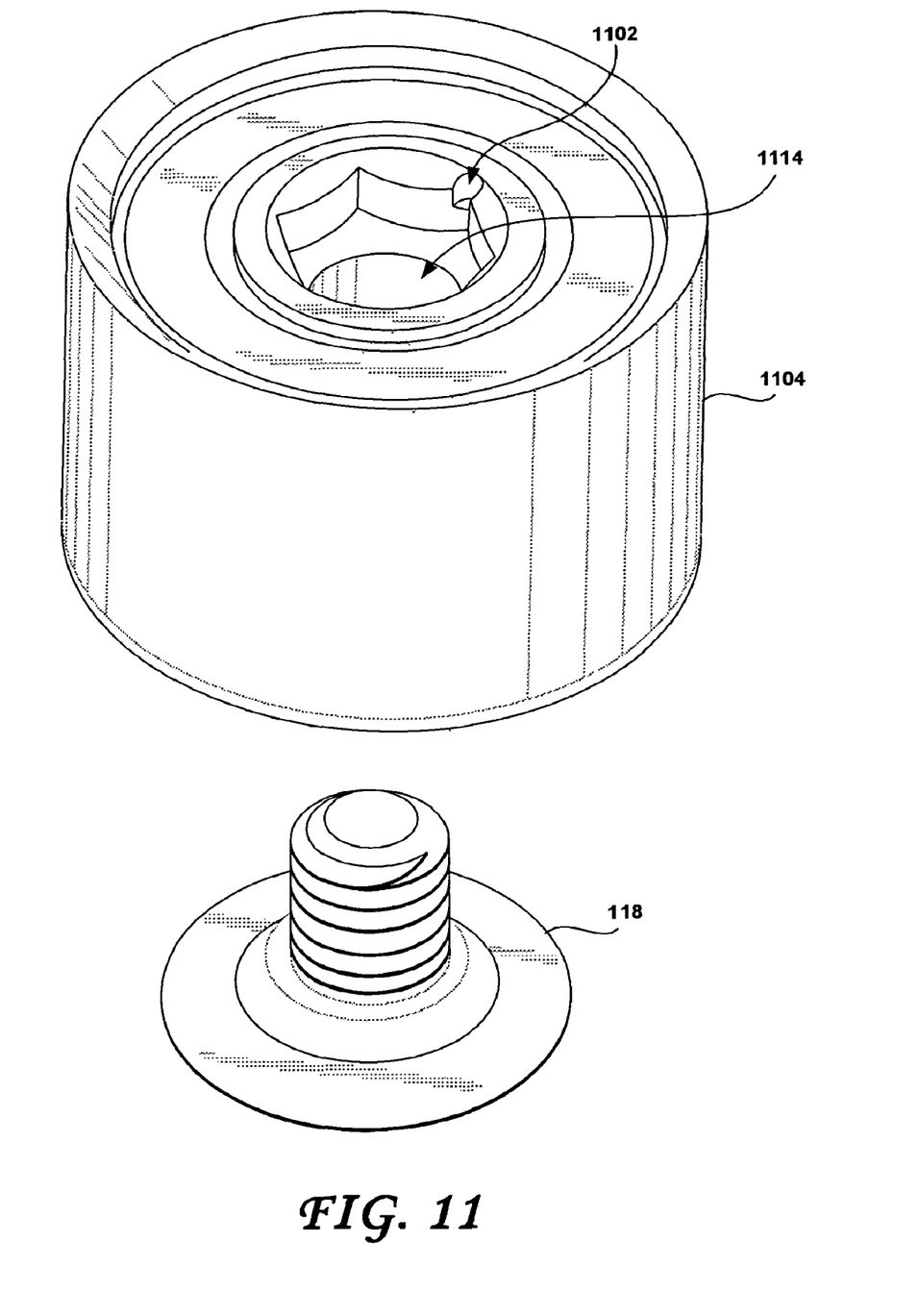
FIG. 11 is a perspective view of a shaft defining an engagement feature and a screw that may be utilized to attach the shaft to a disk drive base, according to an embodiment of the present invention.

According to another embodiment of the present invention, the engagement feature 1114, shown in FIG. 11, may include an orientation mark 1102 that may be used for reference to determine the angle of the shaft 1104 relative to a predefined angle. A machine vision system may be used to detect such orientation mark and determine the shaft angle with respect to the predefined angle. The machine vision assembly may include, for example, a high resolution black and white progressive scan CCD (Charge Coupled Device) video camera such as the XC-HR70 available from Sony Corporation. The XC-HR70 features a ⅓" type IT progressive scan CCD and has a horizontal resolution of 1034 pixels and a vertical resolution of 779 pixels, enabling it to capture images at 29 f/s. Other video cameras may be used, and the optics thereof adapted to the specific requirements of the implementation at hand. The orientation mark 1102 may be or include a dot or a pit or indentation on or within the engagement feature 1114. This orientation mark may be utilized during the pick and place steps in which an embodiment of the present tooling mandrel picks up a head stack assembly (or other drive component) by the engagement feature defined within the shaft 1104, moves the assembly to a predetermined position relative to a disk drive base, orients the assembly to a predefined angle using the orientation mark 1102 as a positional reference, and places the properly oriented head stack assembly onto a predetermined feature of the disk drive base. Thereafter, the screw 118 may be driven through the disk drive base and shaft 1104, while maintaining the head stack assembly in the predefined angle and while countering the torsional forces imposed upon the shaft as the screw 118 is driven.

Figure 12:
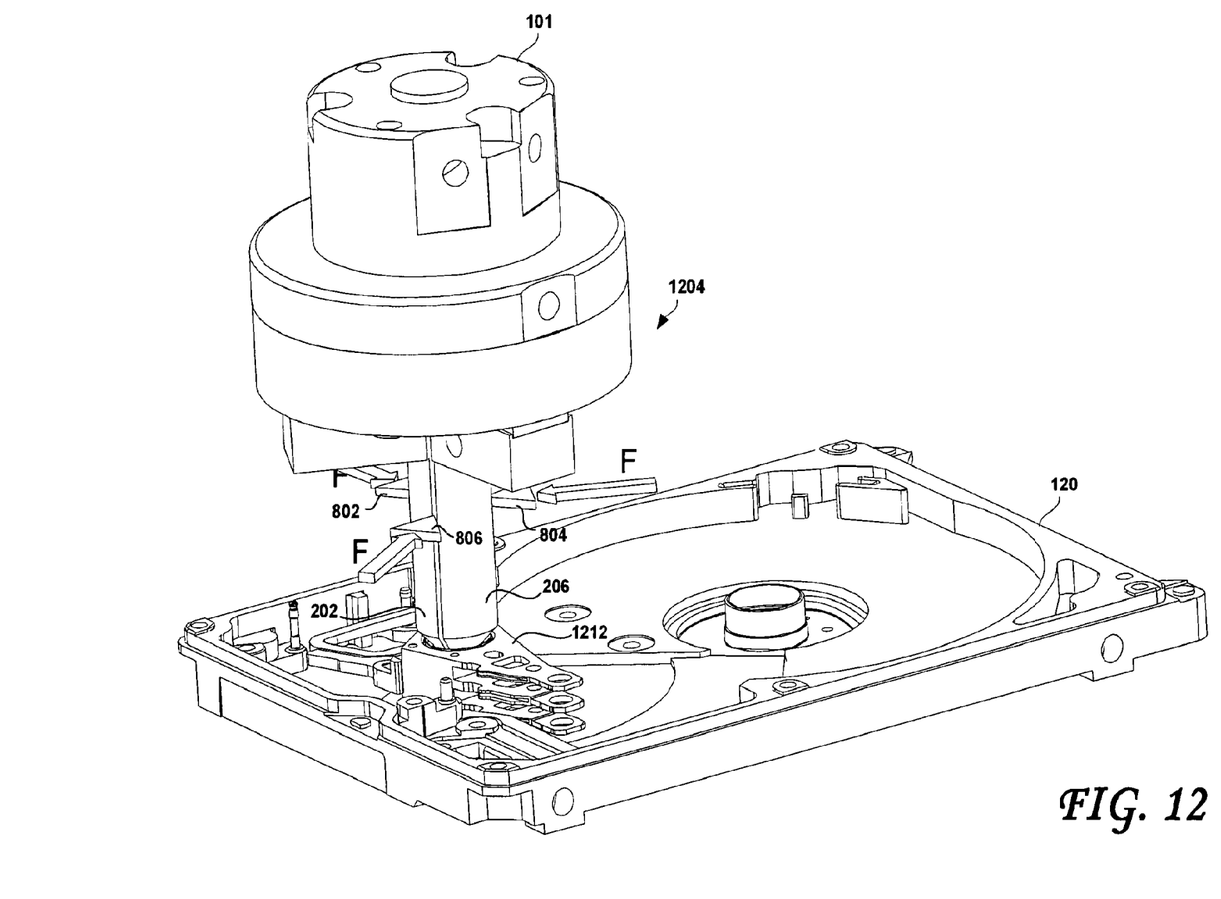
FIG. 12 is a perspective view of a tooling mandrel attaching a head stack assembly to a disk drive base, according to an embodiment of the present invention.

FIG. 12 is a perspective view of a tooling mandrel 1204 attaching a head stack assembly to a disk drive base, according to an embodiment of the present invention. As shown, the tooling mandrel is coupled to an air gripper 101. FIG. 12 shows a three finger embodiment of the present tooling mandrel, similar to that shown in FIGS. 2 and 8. As shown, the movable wedges 802, 804 and 806 (shown in stylized form) may be inserted between the tooling fingers 202, 204 (hidden in FIG. 12, but shown in FIG. 8) and 206 to spread them or maintain them in the spread or second configuration. For example, in one embodiment, the tooling fingers may be moved into the second configuration by hydraulic or pneumatic pressure (for example) and then maintained in that configuration by the movable wedges. The tooling mandrel is shown in FIG. 12 coupled to a head stack assembly 1212 (to simplify the drawing, the head stack assembly 1212 is shown without the head gimbal assembly and other components). The head stack assembly 1212, after having been picked up and the pivot shaft oriented to the predefined angle (using the orientation mark 1102, for example), may then be positioned against the disk drive base 120. Thereafter, according to an embodiment of the present invention, a screw 118 (See FIGS. 2 and 11) may be driven through the disk drive base 120 and through or into the shaft 110 of the pivot bearing cartridge to secure the head stack assembly onto the disk drive base while maintaining the predefined angle. The head stack assembly (or other component picked up and oriented by a tooling mandrel according to an embodiment of the present invention) may also be attached to the disk drive base by, for example, press fitting the shaft into the disk drive base, soldering/welding the shaft to the disk drive base, heat bonding the shaft to the disk drive base and/or disposing a layer of adhesive between the shaft and the disk drive base, to identify but a few possibilities. The head stack assembly may be attached to the disk drive base while the tooling fingers are in the second configuration and the wedges, if utilized, in the second wedge configuration in which the wedges are inserted between adjacent tooling fingers to spread and/or maintain them in the spread configuration. After the head stack assembly has been attached to the disk drive base, the movable wedges 802, 804 and 806 may be removed from between the tooling fingers 202, 204 and 206, and the tooling fingers may then be moved or released to the first configuration, thereby enabling the tooling mandrel to disengage from the attached head stack assembly.

We claim:

1. A method of assembling a disk drive, comprising the steps of:
   providing a head stack assembly including a shaft, the shaft defining a shaft outer diameter and including an engagement feature recessed within the shaft and entirely contained within the shaft outer diameter;
   providing a tooling mandrel, the tooling mandrel including at least two tooling fingers, at least one of the tooling fingers being movable, the at least one movable tooling finger being configured to be moved between a first configuration in which respective distal tips of the tooling fingers are insertable into and removable from the engagement feature and a second configuration in which the distal tips are configured to engage the engagement feature, the tooling mandrel further including a tooling finger spreader coupled to the at least one movable tooling finger and configured to selectively move the at least one movable tooling finger between the first and second configurations;
   locating the distal tips at least partially within the engagement feature with the tooling fingers in the first configuration; and
   moving the at least one movable tooling finger to the second configuration to engage the shaft.

2. The method of claim 1, further comprising:
   providing a disk drive base;
   positioning the shaft against the disk drive base; and
   attaching the shaft to the disk drive base with the tooling fingers in the second configuration to prevent the shaft from rotating relative to the disk drive base.

3. The method of claim 2, further including a step of moving the at least one movable tooling finger to the first configuration after the attaching step.

4. The method of claim 2, wherein the shaft defines an axis of rotation and wherein the positioning step includes orienting the shaft at a predefined angle about the axis of rotation with respect to the disk drive base.

5. The method of claim 4, wherein the shaft includes an orientation mark.

6. The method of claim 4, wherein the orienting step includes rotating the tooling mandrel about the longitudinal axis until the shaft is disposed at the predefined angle about the axis of rotation with respect to the disk drive base.

7. The method of claim 6, wherein the rotation of the tooling mandrel is performed during the positioning step.

8. The method of claim 6, wherein the rotation of the tooling mandrel is performed before the positioning step.

9. The method of claim 2 wherein the attaching step includes using a fastener through the disk drive base to engage the shaft.

10. The method of claim 9, wherein the fastener includes one of a screw and a rivet.

11. The method of claim 2, wherein the attaching step is carried out by at least one of:
   press fitting the shaft into the disk drive base;
   soldering the shaft to the disk drive base;
   heat bonding the shaft to the disk drive base; and
   disposing a layer of adhesive between the shaft and the disk drive base.

12. The method of claim 1, wherein the distal tips are disposed away from one another when the tooling fingers are in the second configuration.

13. The method of claim 1, wherein the distal tips are disposed closer to one another when the tooling fingers are in the first configuration than when the tooling fingers are in the second configuration.

14. The method of claim 1, wherein the distal tips, when the tooling fingers are in the second configuration, are configured to define a cross-sectional shape that includes at least three sides.

15. The method of claim 1, wherein the at least two tooling fingers comprise three tooling fingers.

16. The method of claim 1, further comprising steps of:
   providing at least one movable wedge that is configured to be moved between a first wedge configuration in which the at least two tooling fingers remain in the first configuration and a second wedge configuration in which the at least one wedge is disposed between the at least two tooling fingers to maintain the at least two tooling fingers in the second configuration; and
   moving the at least one wedge to the second wedge configuration to maintain the at least two tooling fingers in the second configuration.

* * * * *